United States Patent Office 3,221,043
Patented Nov. 30, 1965

3,221,043
ETHYLENICALLY UNSATURATED DIHYDROXY DIESTERS
Frank Fekete, Monroeville, Patrick J. Keenan, Pittsburgh, and William J. Plant, Monroeville, Pa., assignors to H. H. Robertson Company, Pittsburgh, Pa., a corporation of Pennsylvania
No Drawing. Filed Dec. 18, 1961, Ser. No. 160,252
6 Claims. (Cl. 260—475)

This invention relates to the preparation of ethylenically unsaturated dihydroxy diesters. More particularly this invention concerns divinyl dihydroxy diesters formed from
(I) dicarboxylic acid; and
(II) a monoepoxy compound selected from the class consisting of ethers and esters having an epoxy aliphatic radical and an ethylenically unsaturated aliphatic radical. Such compounds have the empirical formula

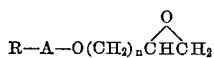

wherein:
R is an ethylenically unsaturated organic radical;
$n$ is an integer from zero through ten; and
A is a divalent group selected from the class consisting of methylene (—$CH_2$—) and carbonyl

Where A is methylene, the resulting epoxy compound is an ether;
Where A is a carbonyl group, the resulting compound is an ester.

In general the dicarboxylic acid may include maleic acid, fumaric acid, succinic acid, adipic acid, phthalic acid, isophthalic acid, terephthalic acid, halogenated phthalic acid, naphthalene dicarboxylic acids, and the like. The epoxy compound may include glycidyl acrylate, glycidyl methacrylate, allyl glycidyl ether and the like.

The present compounds are useful as polymerizable monomers. They may be blended with other polymerizable ethylenically unsaturated monomers such as styrene, vinyl toluene, unsaturated polyesters, and the like to prepare polymerizable resinous compositions. The present compounds are especially reactive under vinyl condensation conditions because of their two vinyl groupings. The present compounds, by virtue of their two pendant hydroxy groups, are also reactive in customary hydroxyl condensations and additions. For example, the present compounds may be reacted with dicarboxylic acids or anhydrides through their pendant hydroxy groups to form long-chain polyesters with ethylenically unsaturated side chains. The presence of the hydroxy groups in an unreacted condition (when the monomers are subjected to vinyl condensations) enhances the adhesive qualities of the resulting polymerized mass.

The principal object of this invention is to provide polymerizable monomers and polymerizable resinous compositions containing the same.

Another object of this invention is to provide a process for preparing the present polymerizable monomers.

A further object is to provide polymerizable resinous compositions utilizing the present monomers.

As illustrative of this invention, the following example will be described:

Example 1.—A mixture of 1.05 mol glycidyl methacrylate (149 g.), 0.5 mol phthalic acid (83 g.), 8.6 millimols triethylamine (1.20 ml.) and 1000 p.p.m. by weight hydroquinone (0.225 g.) was warmed to 100° C. over a period of 45 minutes. The temperature was maintained in the range of 100–110° C. for 2 hours 25 minutes. At the end of this time the acid number of the reaction mixture had decreased to 1. The yield of product was 100 perecnt of theoretical. Chemical analysis showed: C–58.62/58.75; H–5.97/5.78; —OH value was 186/177.

The product was bis(3-methacryloxy-2-hydroxypropyl) phthalate, a water-clear viscous syrup.

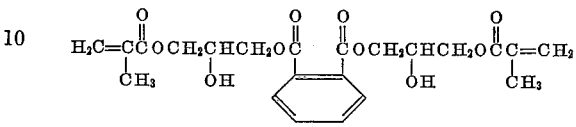

It will be observed that the product has four ester groupings, two pendant hydroxy groups and two terminal vinyl groups.

The product was blended with 1 perecnt by weight of benzoyl peroxide as a polymerization initiator and the mixture was cured at 90° C. for three hours. The homopolymer was a brittle, hard, amber colored substance.

A solution of thirty parts of the product bis(3-methacryloxy-2-hydroxypropyl) phthalate and seventy parts of acetone was prepared.

The solution was sprayed over the surface of a steel panel which was then heated to 150° C. for 2 hours. A hard, brittle, water-white coating was obtained.

REACTANTS

(1) Dicarboxylic acid

As a starting material in the present process, the dicarboxylic acid has the general formula $R'(COOH)_2$ wherein R' is an organic radical normally selected from the class consisting of:

A carbon-to-carbon bond (e.g., oxalic acid);
An aliphatic radical (e.g., adipic acid);
An ethylenically unsaturated aliphatic radical (e.g., maleic acid);
An aryl radical (e.g., phthalic acid); and
Halogenated aryl radicals (e.g., tetrachlorophthalic acid).

Where the dicarboxylic acid of this invention includes ethylenic unsaturated (e.g., maleic acid, fumaric acid), the resulting diester will contain additional ethylenic unsaturation sites.

It is also possible to utilize as the dicarboxylic acid for this invention a double ester formed from two mols of a dicarboxylic acid anhydride and one mol of a glycol. For example, the double ester of maleic acid anhydride and ethylene glycol:

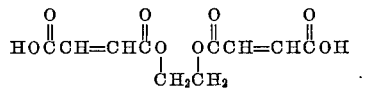

It will be observed that the double ester possesses two terminal carboxylic acid groups which, for the present purposes, qualify it as a dicarboxylic acid.

(2) The epoxy compound

The starting epoxy compound has a terminal epoxy grouping

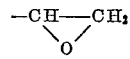

as a part of an aliphatic chain which is linked to an ethylenically unsaturated radical by means of an ester or ether linkage.

One preferred starting material is glycidyl methacrylate because of its ready availability. Glycidyl methacrylate has the formula $$CH_2\overset{O}{\diagup\diagdown}CH-CH_2-O\overset{O}{\overset{\|}{C}}\underset{\underset{CH_3}{|}}{C}=CH_2$$

Glycidyl methacrylate thus is an ester of methacrylic acid and 1,2-epoxy propanol, although it may be formed by reactions which are not normally considered as esterification reactions.

Glycidyl acrylate and allyl glycidyl ether also are preferred starting materials for the present compounds. The general formula of the epoxy compound is $$R-A-C(OH_2)_n C\overset{O}{\overset{\diagup\diagdown}{H}C}\,CH_2$$

wherein A is methylene or carbonyl; R is an organic radical having ethylenic unsaturation; and $n$ is an integer from zero to ten.

Examples of other suitable epoxy compounds are:

Vinyl 4,5-epoxypentanoate
Vinyl 10,11-epoxyundecanoate
Vinyl 9,10-epoxystearate
Vinyl 3,4-epoxycyclohexanecarboxylate
Vinyl 3,4-epoxy-6-methylcyclohexanecarboxylate
Allyl 4,5-epoxypentanoate
Allyl 5,6-epoxy hexanoate
Allyl 9,10-epoxy-stearate
Allyl 10,11-epoxy undecanoate
Allyl 2,3-epoxy-2-ethyl hexanoate
Allyl 3,4-epoxy-2-hydroxybutanoate
Allyl 3,4-epoxy-2-hydroxypentanoate
Allyl 3,4-epoxy-6-methylcyclohexanecarboxylate
2,3-epoxybutyl acrylate
2,3-epoxy-2-methylpropyl acrylate
2,3-epoxy-2-ethylhexyl acrylate
2,3-epoxycyclopentyl acrylate
3,4-epoxycyclohexylmethyl acrylate
3,4-epoxy-6-methylcyclohexylmethyl acrylate
2,3-epoxypropyl crotonate
2,3-epoxybutyl crotonate
2,3-epoxylylopentyl crotonate
3,4-epoxy-6-methylcyclohexylmethyl crotonate
3,4-epoxy-1-vinylcyclohexane

INHIBITOR

Because of the presence of reactive vinyl groups in the reaction mixture, it is essential to maintain an inventory of a suitable vinyl-polymerization inhibitor in the reaction mixture and also in the product monomer. Any of the hydroquinones and quinones have been found to be suitable for this purpose, although it is generally preferred to employ the quinones since the hydroquinones tend to enter into reaction with epoxy groups of the starting materials. Toluquinone and toluhydroquinone are preferred inhibitors since the reaction products appear to be clearer when toluquinone or toluhydroquinone are employed as the inhibitor.

CATALYST

As catalyst for the monomer formation reaction, triethylamine is preferred for reasons of expense, availability and ease of handling. Other tertiary amines may be adapted as the catalyst. Approximately one percent by weight of the catalyst based upon the weight of reactants is suitable.

PROPORTIONS

Approximately one molar quantity of the dicarboxylic acid and two molar quantities of the epoxy compound are combined as starting materials. A slight excess of either reactant may be employed to facilitate total consumption of the other, usually more costly, reactant.

The reactants are combined with or without inert solvent and heated to a reaction temperature between ambient room temperature and about 200° C. for a sufficient period of time to decrease the acid number of the reaction mixture to an acceptably low value indicating substantial completion of the reaction.

REACTION CONDITIONS

Although not employed in Example 1, there is a preferred heating regime for the formulation of the present monomers. Substantial difficulties have been encountered from premature gelation of the reaction mixtures during monomer formation. The preferred heating regime appears to avoid these undesirable gelation difficulties. Specifically the two starting reactants together with inhibitor and catalyst are introduced into a reaction kettle. If desired, a suitable inert solvent may be employed. The reaction mixture is heated from ambient room temperature to a first temperature level between ambient room temperature and about 100 C. over a relatively long heating period, e.g., from about 30 minutes to about five hours. The reaction mixture is maintained at the first temperature level until substantial decrease in the acid number of the reaction mixture has been observed indicating that substantial monomer formation has occurred. Thereafter the reaction mixture is heated to a second temperature level which is greater than the first temperature level and is between about 80 C. and about 200 C. for completion of the reaction. The heating regime which comprises at least two sequential stages appears to avoid the undesirable gelation formations.

An alternative reaction procedure also has been demonstrated to be effective in the present monomer formation reactions. The dicarboxylic acid is heated with inhibitor and catalyst to a suitable temperature between ambient room temperature and about 200 C. Thereafter the epoxy compound is added to the heated dicarboxylic acid in a dropwise manner while the heated acid is continuously stirred.

Inert solvents also may be employed in the reaction mixtures especially where the reactants or products are highly viscous. Xylene and toluene have been found to be suitable solvents for many of the present monomer formation reaction mixtures. Preferably, of course, the solvents are not employed thereby avoiding initial solvent expenses and the costs of repeatedly reboiling solvents.

*Example 2.*—One mol glycidyl methacrylate (142 g.), 0.5 mol isophthalic acid (83 g.), 1.5 weight percent triethylamine (2.63 g.) and 1000 p.p.m. by weight hydroquinone (0.225 g.) were dissolved in 225 g. toluene. The solution was refluxed at 114–120° C. for 15 hours to a final acid number of 6.6. The final hydroxyl number was 172 (theoretical value 177). Toluene was distilled and evaporated under vacuum. The product yield was 86 percent of theoretical. The product was bis (3-methacryloxy-2-hydroxypropyl) isophthalate. The product was a viscous, light-amber colored syrup.

*Example 3.*—A mixture of 1.05 mol glycidyl methacrylate (149 g.), 0.5 mol terephthalic acid (83 g.), 0.75 weight percent triethylamine (1.75 g.) and 1000 p.p.m. by weight hydroquinone (0.225 g.) was heated to 108° C. in 55 minutes. The reaction mixture was maintained at 108–140° C. for 80 minutes when the acid number had decreased to 1.4 indicating substantial completion of reaction. The product was bis (3-methacryloxy-2-hydroxypropyl) terephthalate.

The product was mixed with one percent by weight of benzoyl peroxide and the mixture was heated at 90° C. for three hours to form a brittle, hard, amber-colored homopolymer.

*Example 4.*—Two mols glycidyl methacrylate (284 g.), 1.0 mol adipic acid (146 g.), 0.4 weight percent triethylamine (1.75 g.) and 4 g. hydroquinone were mixed and heated to 110° C. in 30 minutes. An exothermic reaction caused the temperature to rise to 152° C. in 20 minutes. The reaction mixture thereafter cooled to 110° C. in 10 minutes when an acid number of 1.4 was observed. The product was an amber-colored viscous syrup. The product was bis(3-methacryloxy-2-hydroxypropyl) adipate.

The product was mixed with one percent of benzoyl peroxide as a polymerization initiator and the mixture was heated at 90° C. for three hours. The homopolymer product was a hard, amber-colored substance.

Thirty parts of the product bis(3-methacryloxy-2-hydroxypropyl) adipate was mixed with seventy parts by weight of acetone. One percent by weight of benzoyl peroxide and three percent by weight of phosphoric acid were added to the solution. The resulting solution was sprayed over a surface of a steel panel which was then heated at 150° C. for two hours. The solution formed a hard, brittle, water-white coating over the steel panel.

*Example 5.*—A mixture of 1.05 mols glycidyl methacrylate (149 g.), 0.5 mol succinic acid (59 g.), 0.8 weight percent triethylamine (1.75 g.) and 1000 p.p.m. by weight hydroquinone (0.208 g.) was heated at 100–120° C. for 75 minutes until the acid number decreased to less than 1.4. The product was bis(3-methacrylory-2-hydroxypropyl) succinate.

The product was mixed with one percent by weight of benzoyl peroxide as a polymerization initiator. The mixture was heated at 90° C. for three hours to form a hard, brittle, straw-colored homopolymer.

Thirty parts by weight of the product was dissolved in seventy parts by weight of acetone. One percent by weight of benzoyl peroxide and three percent by weight of phosphoric acid were added to the acetone solution. The solution was sprayed over a surface of a steel which was then baked at 150° C. for two hours. The steel panel developed a hard, flexible, water-clear coating.

*Example 6.*—The following ingredients were charged to a reaction kettle:

| | G. |
|---|---|
| 1 mol fumaric acid | 116 |
| 2 mols allyl glycidyl ether | 228 |
| 1 wt. percent triethylamine | ml__ 4.8 |
| 600 p.p.m. toluhydroquinone | 0.210 |

The kettle contents were heated at 100° C. for 13 hours. The acid value was 30.4 at the end of this period indicating 91 percent conversion of the reactants to the product: bis-(3-allyloxy-2-hydroxypropyl) fumarate.

The product was homopolymerized to a rubbery, crosslinked material by adding polymerization initiator and heating.

The product was mixed with an equal weight of styrene. The mixture was catalyzed with an polymerization initiator and heated. A rubbery copolymer was produced.

To demonstrate the reaction of the present product, one mol of the bis-(3-allyloxy-2-hydroxypropyl) fumarate was mixed with one mol of maleic anhydride to form a polyester reaction product.

The mixture was heated at 190–205° C. for five hours. Ten ml. of water was recovered from the reaction system indicating approximately 78 percent conversion to polyesters through conventional condensation reactions.

*Example 7.*—The following ingredients were charged to a reaction kettle:

| | G. |
|---|---|
| 1 mol phthalic acid | 166 |
| 2 mols allyl glycidyl ether | 228 |
| 1 wt. percent triethylamine | ml__ 5.5 |
| 600 p.p.m. toluhydroquinone | 0.236 |

The kettle was heated at 100° C. for about 14 hours until the acid number dropped to about 27 indicating 91 percent theoretical conversion of the reactants. The product was bis(3-allyloxy-2-hydroxypropyl) phthalate.

The product was mixed with an acrylate and copolymerized by adding a polymerization initiator to form a brittle material.

The product is a dihydroxy monomer which can be reacted with dicarboxylic acid anhydrides to form polyesters. One mol of the product (394 g.) and one mol of maleic anhydride (98 g.) were mixed and heated at 185° C. for two hours. The recovered water was 6.5 g. indicating approximately 68 percent conversion of the reactants to a polyester.

*Example 8.*—The following ingredients were mixed in a reaction kettle:

| | G. |
|---|---|
| 1 mol 2,6-naphthalene dicarboxylic acid | 216 |
| 2 mols allyl glycidyl ether | 228 |
| 1 wt. percent triethylamine | 4.4 |
| 600 p.p.m. toluhydroquinone | 0.226 |

The reaction kettle was heated at 100° C. for 11 hours until the acid number of the reaction mixture dropped below 1 indicating bis (3-allyloxy-2-hydroxypropyl) 2,6-naphthalene dicarboxylate.

The product was mixed with an equal weight of an acrylate and cured to a rubbery copolymer after addition of a suitable polymerization initiator.

*Example 9.*—The following ingredients were charged to a reaction kettle:

| | G. |
|---|---|
| 1 mol 2,6-naphthalene dicarboxylic acid | 216 |
| 2 mols glycidyl methacrylate | 284 |
| 1 wt. percent triethylamine | 4.9 |
| 600 p.p.m. toluhydroquinone | 0.293 |

The reaction kettle was heated at 90–100° C. for about 7.5 hours until the acid number dropped to 2. The product was an extremely viscous syrup having a Brookfield viscosity of 73,500 cps. at 25° C. The product was bis (3-methacryloxy - 2 - hydroxypropyl) 2,6-naphthalene dicarboxylate.

The product was homopolymerized at room temperature by adding a polymerization initiator to form a glassy, cross-linked polymer having a Barcol hardness of 35–40.

One part by weight of the product was mixed with 0.2 parts by weight of styrene. A polymerization initiator was added to the mixture which gelled in 30 minutes and cured to a brittle solid copolymer after 20 minutes baking at 130° C.

GENERAL

The products of the present invention have the following empirical formula

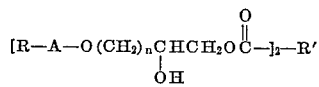

wherein:

R is an ethylenically unsaturated organic radical;
n is an integer from zero through ten;
R' is a divalent organic radical selected from the class consisting of aliphatic radicals, ethylenically unsaturated aliphatic radicals, aryl radicals and halogenated aryl radicals; and
A is a divalent group selected from the class consisting of methylene (—CH₂—) and carbonyl

Where A is a methylene radical, the resulting compound is

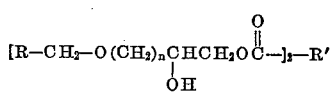

which is a dihydroxy diester diether; and where A is a carbonyl group, the resulting compound is

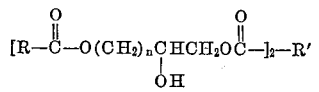

which is a dihydroxy tetraester.

We claim:
1. A dihydroxy double ester having the formula

$$[R-A-O(CH_2)_n CHCH_2 O\overset{O}{\overset{\|}{C}}-]_2-R'$$
$$\phantom{[R-A-O(CH_2)_n C}|\phantom{CH_2 OC]_2-R'}$$
$$\phantom{[R-A-O(CH_2)_n C}OH$$

wherein R is an aliphatic radical selected from the class consisting of $$CH_2=CH- \text{ and } CH_2=\underset{\underset{CH_3}{|}}{C}-$$

$n$ is an integer from zero through ten;

R' is a divalent organic radical derived from a dicarboxylic acid having the formula R'(COOH)$_2$ selected from the class consisting of phthalic acid, isophthalic acid, terephthalic acid, adipic acid, succinic acid, fumaric acid, maleic acid, halogenated phthalic acid, and naphthalene dicarboxylic acid;

and A is a divalent group selected from the class consisting of methylene (—CH$_2$—) and carbonyl $$(-\overset{O}{\overset{\|}{C}}-)$$

2. Bis(3-methacryloxy-2-hydroxypropyl) phthalate.
3. Bis(3-methacryloxy-2-hydroxypropyl) isophthalate.
4. Bis(3-methacryloxy-2-hydroxypropyl) terephthalate.
5. Bis(3-methacryloxy-2-hydroxypropyl) adipate.
6. Bis(3-allyloxy-2-hydroxypropyl) fumarate.

References Cited by the Examiner

UNITED STATES PATENTS

| | | | |
|---|---|---|---|
| 1,733,639 | 10/1929 | Van Schaack et al. | 260—475 |
| 2,384,119 | 9/1945 | Muskat et al. | 260—475 |
| 2,779,783 | 1/1957 | Hayes | 260—475 |
| 2,826,572 | 3/1958 | Shokal | 260—475 |
| 2,985,615 | 5/1961 | Tunteler | 260—45.4 |
| 3,041,305 | 6/1962 | Tessmar et al. | 260—45.4 |

LORRAINE A. WEINBERGER, *Primary Examiner.*

LEON J. BERCOVITZ, LEON ZITVER, *Examiners.*

UNITED STATES PATENT OFFICE
CERTIFICATE OF CORRECTION

Patent No. 3,221,043                      November 30, 1965

Frank Fekete et al.

It is hereby certified that error appears in the above numbered patent requiring correction and that the said Letters Patent should read as corrected below.

Column 2, lines 4 and 18, for "perecnt", each occurrence, read -- percent --; same column 2, line 44, for "unsaturated" read -- unsaturation --; column 3, lines 16 and 17, the formula should appear as shown below instead of as in the patent:

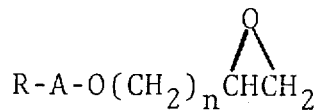

column 5, line 24, for "-methacrylory-" read ---methacryloxy---; line 34, after "steel" insert -- panel --; line 51, for "an" read -- a --.

Signed and sealed this 20th day of September 1966.

(SEAL)
Attest:

ERNEST W. SWIDER                      EDWARD J. BRENNER
Attesting Officer                   Commissioner of Patents